UNITED STATES PATENT OFFICE.

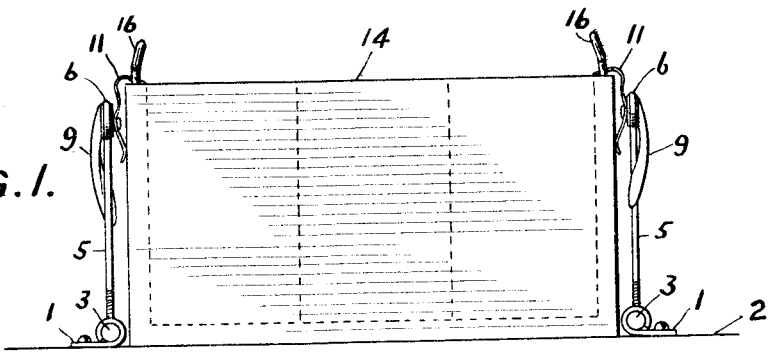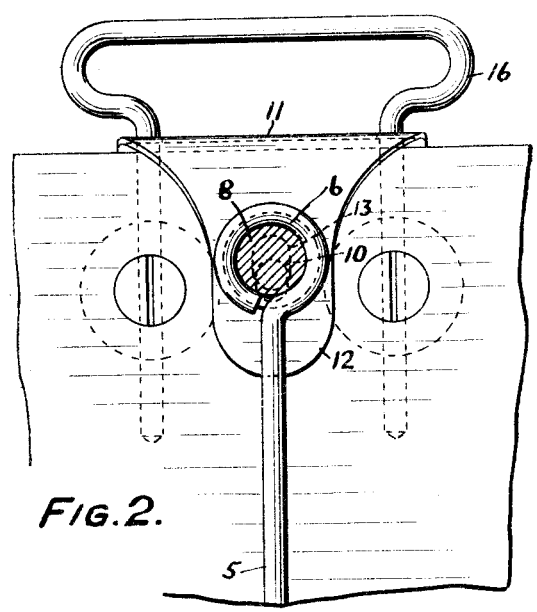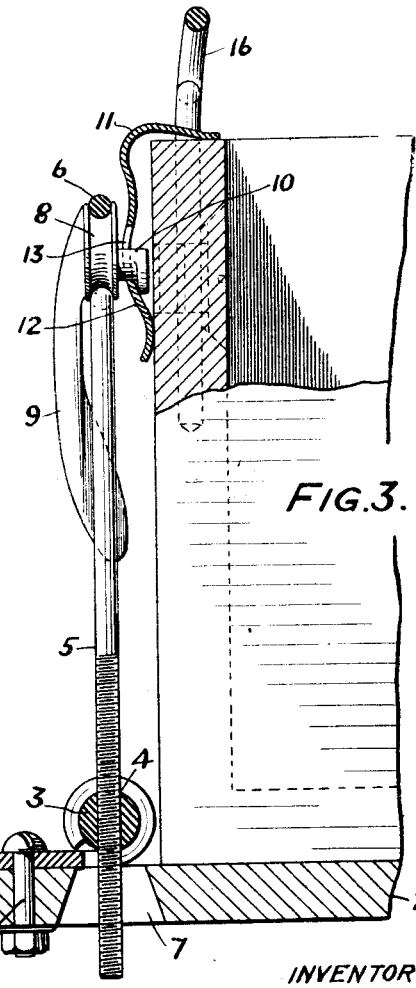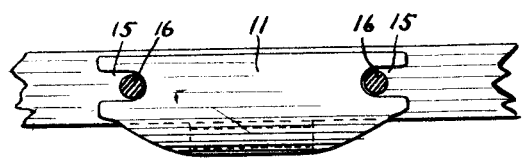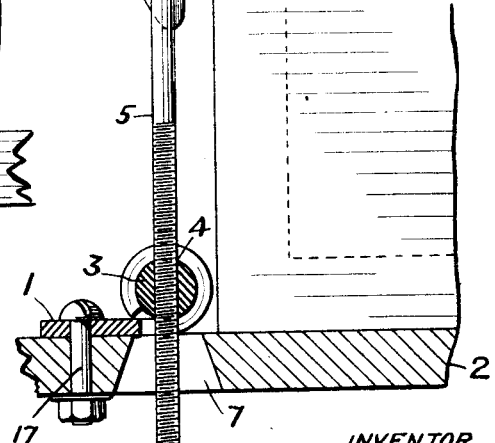

BRUCE FORD, OF PHILADELPHIA, PENNSYLVANIA.

HOLDDOWN FOR STORAGE BATTERIES.

1,172,347.  Specification of Letters Patent.  Patented Feb. 22, 1916.

Application filed April 12, 1913. Serial No. 760,599.

*To all whom it may concern:*

Be it known that I, BRUCE FORD, a citizen of the United States, and a resident of Philadelphia, in the county of Philadelphia and State of Pennsylvania, have invented a certain new and useful Holddown for Storage Batteries, of which the following is a specification.

Boxes containing storage batteries when used in moving vehicles have to be held down and it is the principal object of the present invention to provide a device for this purpose which will occupy comparatively little space and be cheap to make and adjustable and readily applied and removed in use.

Another object of the invention is to provide a holddown for storage batteries which, by reason of its construction and operation, can be adopted by manufacturers of electric vehicles and the like as a standard for use in connection with storage batteries instead of each manufacturer resorting to some more or less unsatisfactory expedient of his own for this purpose.

The invention will be claimed at the end hereof, but will be first described in connection with the embodiment chosen from other embodiments of it for illustration in the accompanying drawings, in which—

Figure 1, is a side view of a battery box held to its support by hold-downs embodying features of the invention. Fig. 2, is a view drawn to an enlarged scale and illustrating, partly in section, the upper portion of the hold-down. Fig. 3, is a view, partly in section, illustrating the hold-down principally in elevation, and Figs. 4 and 5, are sectional plan views illustrating details of construction.

In the drawings 1 is a bifurcated claw which may be a stamping and it is adapted for attachment to a battery support 2. The battery support 2 may be the floor of a battery chamber such as is usually provided in electric vehicles and the like, and the claw may be attached either to the top or bottom of the battery support 2, although it is shown as attached to the top of the support in the drawings.

3, is a transversely perforated pintle turnable in the claw 1 and having its opening 4 located in the bifurcation of the claw.

5, is a rod penetrating the opening 4 in the pintle and having screw and thread connection therewith. This rod 5 is arranged in the bifurcation of the claw and at its upper end is provided with an eye 6. The support 2 may be provided with an opening 7 for the accommodation of the rod 5.

8, is a grooved disk turnable in the eye 6 and provided with a handle 9 and with an eccentrically arranged headed-pin 10, the eccentric together with the pin and handle may be cast in one piece.

11, is a hook member having a spring shank 12 perforated at 13 for the detachable reception of the headed-pin 10. This hook member engages the top of the wall of the battery box 14 and is marginally notched as at 15 for engagement with the shanks of the handle 16. The hook member may be a stamping.

The parts consisting as they do principally of castings and stampings and rods or pieces of bar metal are comparatively easily and cheaply manufactured. Furthermore the hold-down can be readily applied to the battery support as by means of bolts 17 and the parts of the hold-down can be readily assembled.

In use the hook member 11 cannot slip off the top of the battery box because the notches 15 engaging the shanks of the handle 16 prevent such an accident, yet the hook members can be readily applied to different battery boxes and for this purpose they can be detached, if desired, by moving the pin 10 out of engagement with the opening 16. Adjustments can be made by screwing the rods 5 through the pintles 3 or unscrewing them since these parts constitute what may be called a turn-buckle and when desired and when the pins 10 are disconnected from the hook members these rods can be swung out of the way so that the mechanism is in effect a hinge turn-buckle. After the proper adjustments have been accomplished all that it is necessary to do in order to clamp the battery box is to turn the disks by means of the handles 9 until the pins 10 have slightly passed the line of the centers of the disks and until the handles 9 are seated on the rods 5. In order that the pressure may not be too great the spring shanks of the hook members are provided and by yielding, these spring shanks permit of the proper alinement of the pin 10 with the center of the disk. Evidently the hold-down occupies comparatively little space which is, of course, advantageous.

It will be obvious to those skilled in the art that modifications may be made in details of construction and arrangement, hence the invention is not intended to be limited as to such matters nor otherwise further than the prior state of the art may require, but

Having thus described the nature and objects of my invention, what I claim as new and desire to secure by Letters Patent is:

1. In a hold-down device the combination of a claw, a pintle turnable in the claw and provided with a threaded opening, a threaded hold-down rod engaging the threaded opening in the pintle, and clamping means connected with the free end of the rod.

2. A hold-down for storage battery boxes comprising the combination of a claw, a pintle turnable in the claw and provided with an opening, a rod arranged through the opening in the pintle and having an eye, a grooved disk turnable in the eye and provided with an eccentric headed-pin, and a hook member connected with the pin, substantially as described.

3. A hold-down for storage battery boxes comprising the combination of a claw, a pintle turnable in the claw and provided with an opening, a rod arranged through the opening in the pintle and having an eye, a grooved disk turnable in the eye and provided with an eccentric headed-pin, and a hook member detachably connected with the pin, substantially as described.

4. A hold-down for storage battery boxes comprising the combination of a claw member consisting of a bifurcated metal stamping, a transversely perforated pintle turnable in the claw, a rod penetrating the opening in the pintle and having a screw-and-thread connection therewith and arranged in the bifurcation of the claw and having at one end an eye, a grooved disk turnable in the eye and provided with a handle and with an eccentric headed-pin, and a hook member consisting of a stamping having a spring shank perforated for the reception of the headed-pin and having marginal notches, substantially as described.

In testimony whereof I have hereunto signed my name.

BRUCE FORD.

Witnesses:
 GEO. M. HOWARD,
 EDGAR L. LONGAKER.